United States Patent [19]

Ruggeri

[11] 4,451,367
[45] May 29, 1984

[54] SEDIMENTATION TANK

[75] Inventor: Antonio Ruggeri, Johannesburg, South Africa

[73] Assignee: Pasquale Vannucci, Johannesburg, South Africa; a part interest

[21] Appl. No.: 330,638

[22] Filed: Dec. 15, 1981

Related U.S. Application Data

[63] Continuation of Ser. No. 162,331, Jun. 23, 1980, abandoned.

[30] Foreign Application Priority Data

Jun. 28, 1979 [ZA] South Africa ............... 79/3222

[51] Int. Cl.³ .................. C02F 1/52; B01D 21/01
[52] U.S. Cl. .................... 210/207; 210/220; 210/513
[58] Field of Search ............... 210/200, 201, 202, 205, 210/206, 207, 208, 209, 220, 513, 519, 520, 523

[56] References Cited

U.S. PATENT DOCUMENTS

| | | | |
|---|---|---|---|
| 2,177,167 | 10/1939 | Bendel | 210/519 |
| 3,258,123 | 6/1966 | Fontaine | 210/519 |
| 3,307,702 | 3/1967 | Mackrle | 210/207 |
| 3,495,712 | 2/1970 | Schreiber | 210/220 |
| 3,560,379 | 2/1971 | Muskat | 210/738 |
| 3,822,788 | 7/1974 | Dunker | 210/519 |
| 3,917,532 | 11/1975 | King | 210/220 |
| 3,932,275 | 1/1976 | Mewes | 210/907 |
| 3,984,321 | 10/1956 | Kaelin | 210/220 |
| 4,038,185 | 7/1977 | Kline | 210/519 |
| 4,127,488 | 11/1978 | Bell | 210/519 |
| 4,146,478 | 3/1979 | Rongved | 210/220 |

FOREIGN PATENT DOCUMENTS

| | | | |
|---|---|---|---|
| 181574 | 4/1955 | Austria | 210/207 |
| 421266 | 2/1924 | Fed. Rep. of Germany . | |
| 274816 | 11/1926 | Fed. Rep. of Germany | 210/519 |
| 2001211 | 7/1971 | Fed. Rep. of Germany . | |
| 2036047 | 1/1972 | Fed. Rep. of Germany | 210/220 |
| 601025 | 4/1978 | U.S.S.R. | 210/519 |

*Primary Examiner*—Ernest G. Therkorn
*Attorney, Agent, or Firm*—Ladas & Parry

[57] ABSTRACT

A sedimentation tank comprises two sedimentation sections each extending from a narrow end at a common pole to a wide end on the periphery of the structure. The sections are walled by a double start spiral. A flocculating flume runs in one wall and an overflow launder on top of another wall. The spirals preferably follow an exponential law.

2 Claims, 2 Drawing Figures

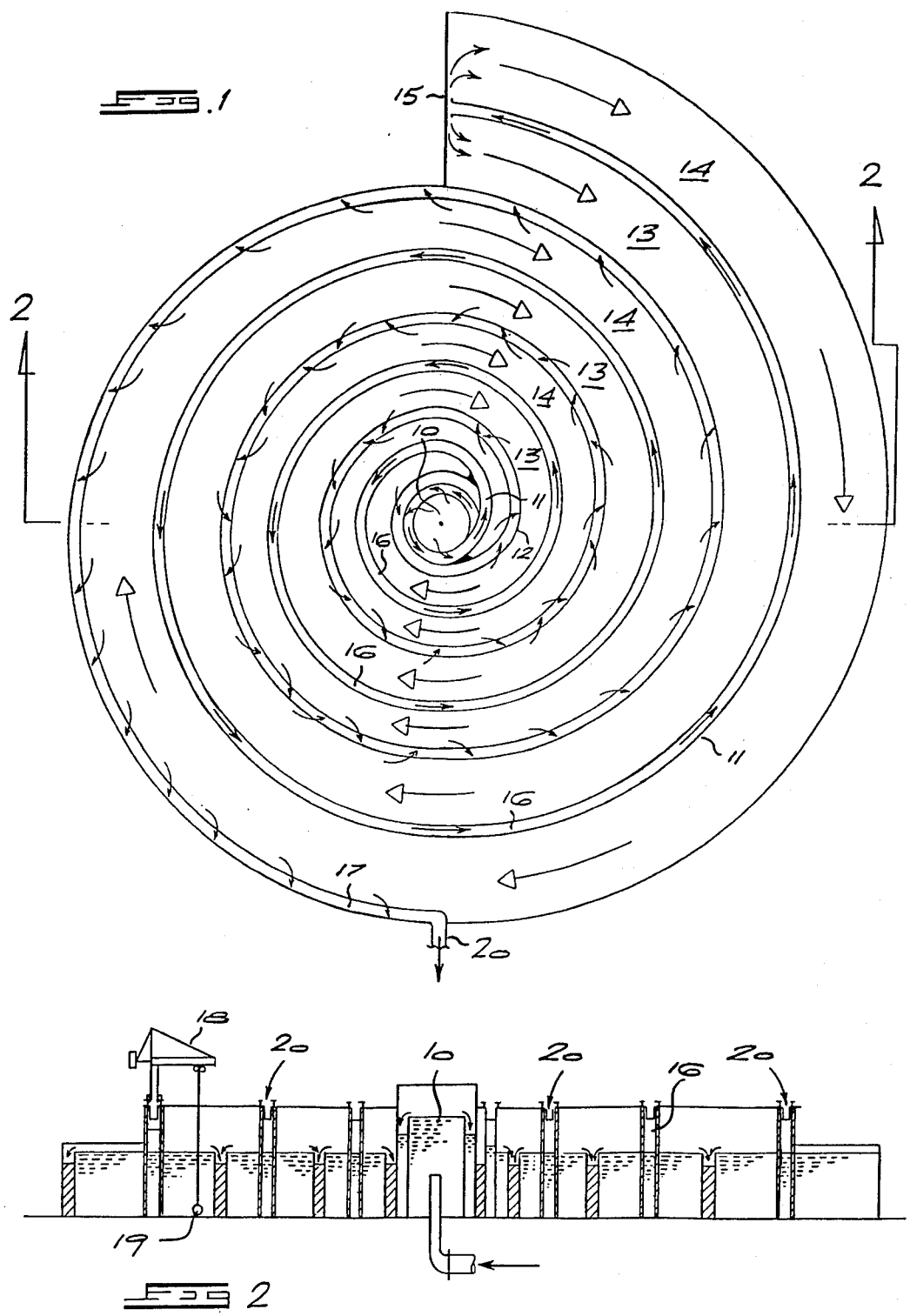

SEDIMENTATION TANK

This is a continuation, of application Ser. No. 162,331 filed June 23, 1980 now abandoned.

BACKGROUND OF THE INVENTION

This invention relates to a sedimentation tank.

Conventionally turbid water from streams and dams is treated by first removing solids by means of gravity sedimentation, then filtering the clarified water and finally sterilising the water.

To ensure that the solids causing the turbidity settle out they are caused to flocculate usually as a result of suitable flocculating agents. In the flocculation process the solid particles form flocs which gradually coalesce to sizes large enough to settle out in the sedimentation process.

In practical water treatment plants long flocculating flumes are used and the floc-containing water is treated in large sedimentation tanks. Such tanks and their auxiliary installations are expensive to build and occupy large areas of ground.

Obviously it would be an advantage to reduce the ground space required for such treatment plants and to reduce necessary engineering work.

SUMMARY OF THE INVENTION

According to the invention a sedimentation tank comprises a plurality of sedimentation sections each extending from a narrow zone at a common pole to a wide zone remote from the pole, a series of walls bounding and separating the sections, the walls being positioned along substantially spiral paths following substantially the same spiral law about the common pole, an inlet for flocculated liquid at the widest zones of the sections and an overflow launder provided on a wall bounding each section.

In the preferred form of the invention there are two sections walled by a double start spiral to provide two sedimentation sections side by side and a wall dividing the sections is provided with a flocculating flume running from the common pole to the inlets of the sections. In the latter case there would usually be a mixing well at the centre of the spiral and leading into the flocculating flume.

A sludge channel may be formed above the flocculating flume.

DESCRIPTION OF THE DRAWINGS

FIG. 1 is a schematic plan view of a sedimentation tank according to the invention, and FIG. 2 is a section on the line 2—2 of FIG. 1.

DESCRIPTION OF A PREFERRED EMBODIMENT

In the illustrated embodiment there is a central cylindrical mixing well 10 from which unwind two spiral walls 11 and 12 thus constituting a double start spiral structure with tank sections 13 and 14 between the arms of the spiral walls 11 and 12. An end wall 15 closes off the sections 13 and 14.

In the wall 11 there is formed an open topped duct into which liquid from the well 10 overflows. The duct is a flocculating flume 16. A suitable flocculating agent is added to water fed to the well 10. At the end wall 15 flocculated water flows into the sections 13 and 14 and flows back towards the centre of the spiral structure along a path which constantly diminishes in width.

From about six o'clock in FIG. 1 the inwardly flowing water encounters a launder 17 formed on top of the wall 12 and clear water commences to overflow into the launder 17 which extends to the central well 10.

Floc settles in the form of a sludge on the floors of the sections 13 and 14 and has to be removed periodically. For this purpose a sludge channel 20 is formed above the flume 16 (FIG. 2) and formed at the top with rails along which a crane 18 can move. The crane 18 carries a submersible pump 19 which discharges into the channel 17.

In use water treated with a flocculating agent overflows from the feed well 10 into the flume 16 and eventually flows into the sections 13 and 14. When the level in the sections 13 and 14 reaches that of the launder 17 clear water runs into that launder and to a draw-off 20. From time to time as required the crane 18 and the pump 19 are used to remove sludge from the floors of the sections 13 and 14 and discharge it into the channel 17 from which it runs off to a suitable settling pond.

Note that the sides of the flume 16 are also on spirals. This is not immediately apparent from the drawings due to the reduction in scale. The effect of this is that at the start of the flume 16 the water flows faster and thus gets stirred to a greater extent than later on.

The launder 17 may also be bounded by spiral sides.

In FIG. 1 the various walls and sides follow an exponential spiral pattern which has been slightly adjusted to allow for the use of shuttering curved about fixed points. Other spiral laws, e.g. a logarithmic law, may also be used, but an exponential spiral is preferred.

The illustrated tank is relatively cheap, very efficient and for what it does occupies a remarkably small area.

I claim:

1. A sedimentation tank comprising a pair of walls extending from a common pole towards an inlet for flocculated liquid along substantially sprial paths such that the distance between the adjacent turns of each wall, measured along a substantially radial line from the common pole increases with increasing distance away from the common pole, a flocculation flume in one wall and an overflow launder in the second wall, the flume and the launder each having sides the distance between which likewise increases with increasing distance from the common pole, the flocculating flume terminating at the inlet and the launder terminating at a discharge substantially diametrically opposite the inlet.

2. The tank claimed in claim 1 including a mixing well at the common pole for adding flocculating agents which mixing well leads into the flocculating flume.

* * * * *